W. A. DICK.
COMMUTATOR.
APPLICATION FILED SEPT. 20, 1906.
984,125.
Patented Feb. 14, 1911.
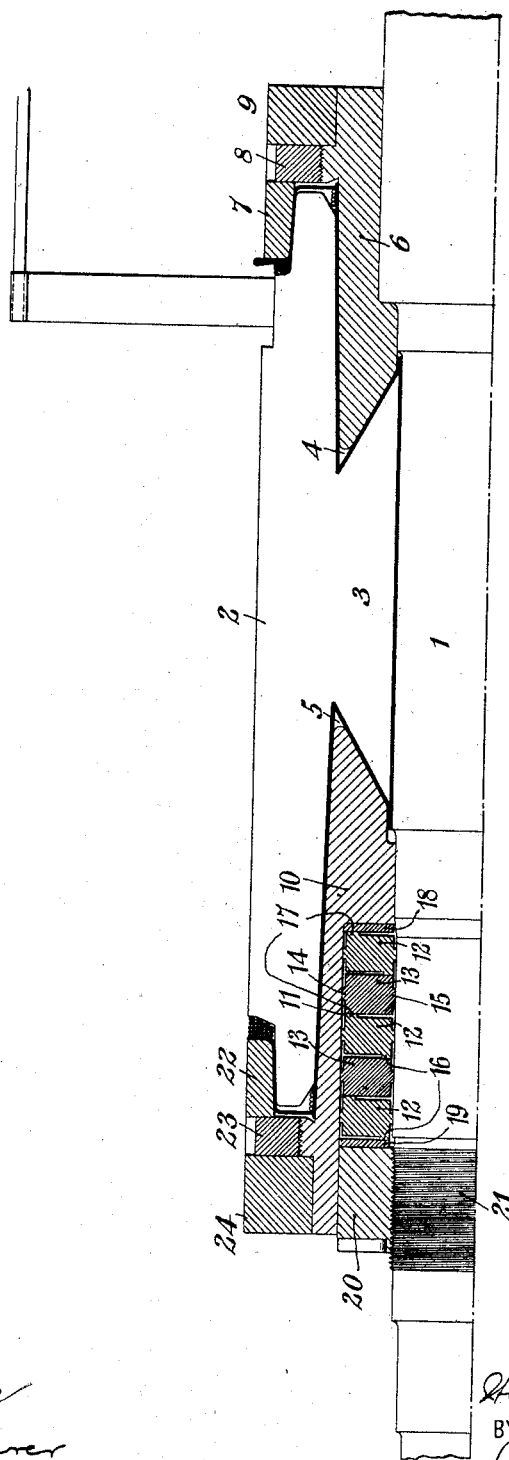

UNITED STATES PATENT OFFICE.

WILLIAM A. DICK, OF PITTSBURG, PENNSYLVANIA, ASSIGNOR TO WESTINGHOUSE ELECTRIC & MANUFACTURING COMPANY, A CORPORATION OF PENNSYLVANIA.

COMMUTATOR.

984,125. Specification of Letters Patent. Patented Feb. 14, 1911.

Application filed September 20, 1906. Serial No. 335,505.

*To all whom it may concern:*

Be it known that I, WILLIAM A. DICK, a citizen of the United States, and a resident of Pittsburg, in the county of Allegheny and State of Pennsylvania, have invented a new and useful Improvement in Commutators, of which the following is a specification.

My invention relates to commutators for dynamo-electric machines, and it has for its object to provide a device of this character which automatically adapts itself to changes in temperature in such manner as to obviate loosening or displacement of its parts.

The single figure of the accompanying drawing is a longitudinal section of one-half of the commutator cylinder and the shaft upon which it is mounted.

The large amounts of current carried by the segments of commutators of certain dynamo-electric machines produce such a degree of heat as to cause considerable expansion of the segments and consequently, as ordinarily constructed, such segments, when subsequently operated at lower temperatures are likely to become so loosened, by reason of the contraction of the metal, as to impair the operation of the machine if not actually cause disarrangement and disruption of the parts. In order to obviate the difficulties above indicated, I provide an auxiliary means, in conjunction with the clamping devices usually employed, which will permit of the longitudinal expansion of the commutator segments under the influence of high temperatures and will act resiliently in such manner as to clamp the parts securely when contraction takes place at lower temperatures.

In the drawing, the commutator cylinder is shown as mounted directly upon a shaft 1, but it will be understood that it may be mounted upon a spider or other auxiliary supporting structure. The commutator bars or segments 2 are severally provided with inward projections or tongues 3 which are formed by end-cut recesses 4 and 5 and the segments are clamped to the support at one end by means of a clamping bushing 6, the inner end of which projects into the recesses 4, and by clamping rings 7, 8 and 9 which may be of any usual or suitable construction. The opposite end of the commutator cylinder is provided with a clamping bushing 10, the inner end of which is formed to fit the other recesses 5, and its inner side is cut away to provide an annular chamber 11 within which are located a plurality of rings 12 and 13 which are preferably formed of steel or other suitable resilient material. The rings 13 are provided with annular projections 14 and 15 on their exterior and interior peripheries, respectively, and the rings 12 are provided with like projections and also with an annular projection 16 at one side adjacent to the inner periphery and a similar annular projection 17 at its other side and adjacent to its outer periphery.

As indicated in the drawings, I have provided two rings 13 and three rings 12 so disposed that they alternate with each other, but it will be understood that the number may be varied from that shown, within any desired limits. At the inner end of the recess 11 is located an annular plate 18 against which the projection 17 of the inner ring 12 rests. An annular plate 19, similar to plate 18, is located at the outer end of the recess 11 so as to rest against the projection 16 of the ring 12 at that end of the recess. A clamping nut 20 makes a screw-threaded engagement with a threaded portion 21 of the shaft 1 and serves to clamp the rings and bushings together and against the tongue 3. The usual or suitable auxiliary clamping rings 22, 23 and 24 may be provided, but since these do not constitute parts of my invention except in so far as they are elements of the complete structure, specific description of them is unnecessary.

It will be understood from the illustration and the foregoing description that when the segments 2 expand longitudinally under the influence of heat, the rings 12 and 13 will be distorted from their normal form to such a degree as may be necessary on account of such expansion of the segments, this being possible by reason of the spaces between them which are provided by the annular projections at the sides and peripheries. It will also be understood that subsequent contraction, by reason of lower temperatures, will be accompanied by the return of the rings to their normal forms and positions, by reason of the fact that they are of resilient material and cannot, therefore, be permanently distorted to any material degree unless the force which causes the distortion is maintained.

I claim as my invention:

1. A commutator cylinder having a clamping ring and a series of resilient rings between the clamping ring and the adjacent ends of the cylinder segments, adjacent rings of said series being partially separated by annular spaces some of which are open at the outer and some at the inner peripheries of the rings.

2. A commutator cylinder having a clamping ring at one end and a series of resilient rings interposed side-by-side between the clamping ring and the ends of the cylinder segments, adjacent rings of said series being partially separated by annular spaces some of which are open at the outer and some at the inner peripheries of the rings between which they are located.

3. A commutator cylinder having a clamping ring at one end and a compressible resilient structure interposed between the clamping ring and the ends of the cylinder segments, and embodying annular spaces or slots which are open at the inner and the outer surface of the structure alternately.

4. A commutator cylinder having a clamping ring and a plurality of rings interposed between the clamping ring and the cylinder segments, some of which are severally provided with an outer flange at one side and an inner flange at the other side.

5. A commutator cylinder having a clamping ring at one end and a plurality of rings interposed between the clamping ring and the cylinder segments, some of which are severally provided with a laterally projecting inner flange at one side and a corresponding outer flange at the other side.

6. A commutator cylinder having a clamping ring at one end and a plurality of rings interposed between the clamping ring and the cylinder segments, some of which have lateral projections adjacent to their inner peripheries at one side and similar projections adjacent to their outer peripheries at the other side.

In testimony whereof, I have hereunto subscribed my name this 13th day of September, 1906.

WILLIAM A. DICK.

Witnesses:
OTTO S. SCHAIRER,
BIRNEY HINES.